(12) United States Patent
Nakamura et al.

(10) Patent No.: US 9,528,396 B2
(45) Date of Patent: Dec. 27, 2016

(54) HEAT RECOVERY STEAM GENERATOR AND POWER PLANT

(75) Inventors: Keiichi Nakamura, Yokohama (JP); Hideaki Shimada, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 572 days.

(21) Appl. No.: 14/007,190

(22) PCT Filed: Mar. 26, 2012

(86) PCT No.: PCT/JP2012/057785
§ 371 (c)(1),
(2), (4) Date: Feb. 3, 2014

(87) PCT Pub. No.: WO2012/133333
PCT Pub. Date: Oct. 4, 2012

(65) Prior Publication Data
US 2014/0130476 A1    May 15, 2014

(30) Foreign Application Priority Data

Mar. 25, 2011  (JP) ................. 2011-067547

(51) Int. Cl.
*F01K 23/10*   (2006.01)
*F02C 9/28*    (2006.01)
(Continued)

(52) U.S. Cl.
CPC .............. *F01K 23/105* (2013.01); *F02C 9/28* (2013.01); *F22B 1/1815* (2013.01); *F01K 3/24* (2013.01);
(Continued)

(58) Field of Classification Search
CPC ...... F01K 23/105; F01K 23/10; F01K 23/103; F01K 3/18; F01K 3/24; F02C 9/28; F05D 2270/303–2270/3061; Y02E 20/16
See application file for complete search history.

(56) References Cited

U.S. PATENT DOCUMENTS 3,505,811 A * 4/1970 Underwood .......... F01K 23/105
60/39.181
4,455,614 A * 6/1984 Martz ..................... F01K 23/10
290/40 R
(Continued)

FOREIGN PATENT DOCUMENTS

JP    1-318802      12/1989
JP    9-210302 A    8/1997
(Continued)

OTHER PUBLICATIONS

Japanese Office Action issued Apr. 1, 2014 in Patent Application No. 2011-067547 with English Translation.
(Continued)

*Primary Examiner* — Christopher Besler
*Assistant Examiner* — Matthew P Travers
(74) *Attorney, Agent, or Firm* — Oblon, McClelland, Maier & Neustadt, L.L.P.

(57) ABSTRACT

An auxiliary burner configured to heat exhaust gas on an upstream side of any one of heat exchangers, and a fuel supply system configured to supply fuel to the auxiliary burner. To avoid damage of a heat-transfer pipe by exhaust gas of high temperature, a reference value on which the restriction on the charging quantity to be supplied to the auxiliary burner is based is set, and the charging quantity of fuel to the auxiliary burner is restricted so as not to exceed a limit defined by the reference value.

7 Claims, 2 Drawing Sheets

(51) Int. Cl.
*F22B 1/18* (2006.01)
*F01K 3/24* (2006.01)
(52) U.S. Cl.
CPC ... *F05D 2270/303* (2013.01); *F05D 2270/306* (2013.01); *F05D 2270/335* (2013.01); *Y02E 20/16* (2013.01)

(56) References Cited

U.S. PATENT DOCUMENTS

2004/0088966 A1   5/2004  Tanaka
2010/0275610 A1*  11/2010 Oguchi .................. F01K 13/02
                                                    60/773

FOREIGN PATENT DOCUMENTS

| JP | 2001-108202    | 4/2001 |
| JP | 2001-116208 A  | 4/2001 |
| JP | 2004-68652     | 3/2004 |
| JP | 2004-162620 A  | 6/2004 |
| WO | WO 2008/107916 A1 | 9/2008 |

OTHER PUBLICATIONS

International Search Report issued May 1, 2012, in PCT/JP2012/057785.
Office Action issued Aug. 19, 2014, in Korean Patent Application No. 10-2013-7027757 with English translation.
Office Action issued Jun. 22, 2016 in German Patent Application No. 112012001440.5 (with English-language Translation).

* cited by examiner

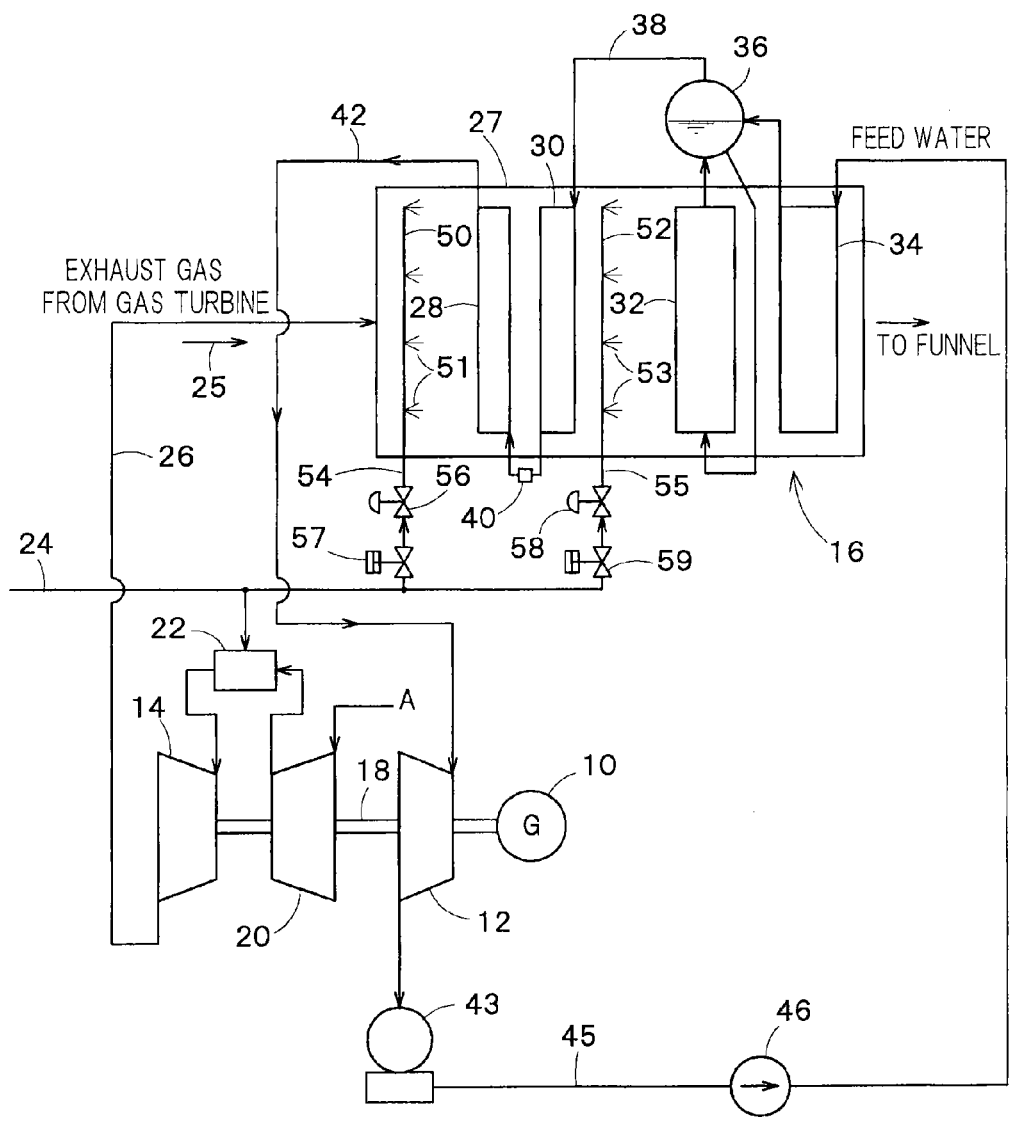
F I G. 1

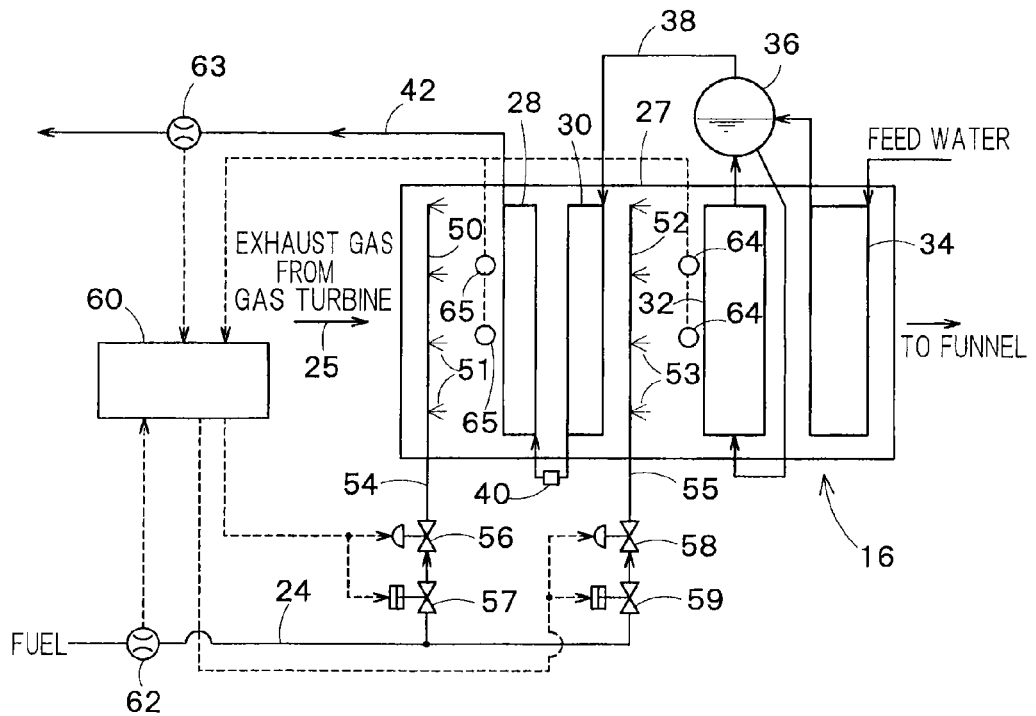
F I G. 2
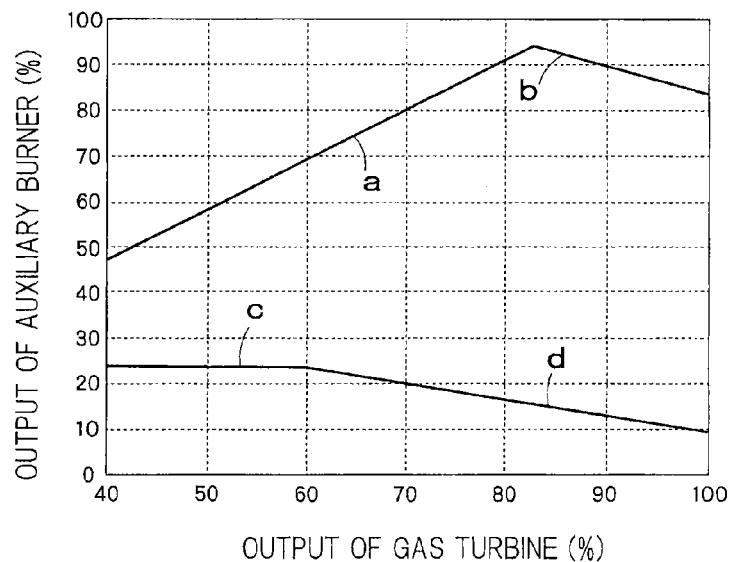
F I G. 3

HEAT RECOVERY STEAM GENERATOR AND POWER PLANT

CROSS-REFERENCE TO RELATED APPRICATION

This application is based upon and claims the benefit of priority from Japanese Patent Application No. 2011-67547 filed on Mar. 25, 2011, the entire contents of which are incorporated herein by reference.

TECHNICAL FIELD

An embodiment of the present invention relates to a heat recovery steam generator and a power plant.

BACKGROUND ART

In recent year, combined-cycle power generation currently becomes the major stream in thermal power plants, in order to improve thermal efficiency of the plants. A combined-cycle power plant is a power plant in which a heat recovery steam generator is combined with a gas turbine and a steam turbine. The gas turbine is provided with combustion gas of high temperature and high pressure from a combustor. The gas turbine is revolved by expansion of the combustion gas so that a generator is rotated. Thereafter, exhaust gas is introduced into the heat recovery steam generator. In the heat recovery steam generator, steam is generated by utilizing the thermal energy of the exhaust gas. Steam is supplied to the steam turbine, and the generator is rotated by the steam turbine in collaboration with the gas turbine.

In general, a conventional heat recovery steam generator is a boiler which generates steam corresponding to heat of exhaust gas discharged from a gas turbine in order to supply the steam to the steam turbine. A heat recovery steam generator provided with an auxiliary combustion burner, which is capable of heating up exhaust gas, has been prevails in recent year. This is because decrease in the output of the gas turbine in the summer season results in reduction in an exhaust gas amount, so that it is necessary to compensate decrease in amount of steam generated by the heat recovery steam generator, and because steam should be also supplied to a cogeneration plant, a distilling plant and so on, in addition to the steam turbine.

In a newly developed heat recovery steam generator, the auxiliary burner shows a tendency to have a large size, with a view to increasing a steam supply amount. As a result of it, as exhaust gas temperature in the heat recovery steam generator rises, auxiliary burners are installed on a plurality of locations for the purpose of preventing the generator constituent parts from deteriorating the durability and reliability(see JP2001-116208A, for example).

DISCLOSURE OF THE INVENTION

In the heat recovery steam generator including the auxiliary burner, a thermal balance inside the heat recovery steam generator shows a large difference between when the auxiliary burner is fired to heat exhaust gas and when the auxiliary burner is ceased. Concerning facilities such as a heat-transfer pipe used in the heat recovery steam generator, facilities that are capable of keeping a thermal balance between one condition where the auxiliary burner is fired and another condition where the auxiliary burner is suspended are preferable. As a result, the facilities tend to be over-equipped.

On the other hand, unless the relationship between the output of the gas turbine and the fuel input to the auxiliary burner is kept appropriately, too much increase of load of the auxiliary burner may damage the heat-transfer pipe or the like in the heat recovery steam generator. For example, when the output of the gas turbine is on a high level, there is sufficient exhaust gas to be supplied to the heat recovery steam generator. Thus, when the fuel input to the auxiliary burner is too much, the temperature of exhaust gas excessively rises, resulting in causing damage to equipment around the auxiliary burner.

In addition, when steam necessary for the heat recovery steam generator can be sufficiently obtained only by exhaust gas from the gas turbine, the auxiliary burner is extinguished. Under these circumstances, since a small amount of steam is generating in the generator, the flow rate of steam flowing in the heat-transfer pipe comes short. In this case, the heat-transfer pipe of an superheater may be heated beyond the allowable range by the exhaust gas.

Therefore, the object of the present invention is to provide a heat recovery steam generator that can solve the above problem of the prior art, and can appropriately restrict a quantity of fuel to be charged to the auxiliary burner, depending on the operation condition of the gas turbine, so as not to damage equipment such as heat-transfer pipes in the heat recovery steam generator.

Another object of the present invention is to provide a power plant including a heat recovery steam generator that can adequately set a limit on a quantity of fuel charged to the auxiliary burner, depending on the operation condition of the gas turbine.

In order to achieve the aforementioned object, the present invention is a heat recovery steam generator in which a plurality of heat exchangers consisting of a superheater, an evaporator and an economizer are installed in a duct along a flow direction of an exhaust gas from a gas turbine, so as to generate steam by utilizing the exhaust gas of the gas turbine, the heat recovery steam generator comprising:

an auxiliary burner configured to heat the exhaust gas on the upstream side of any one of the heat exchangers;

a fuel supply system configured to supply fuel to the auxiliary burner; and a fuel limiting means configured to set a reference value on which the restriction on the charging quantity to be supplied to the auxiliary burner is based, and to restrict the charging quantity of fuel to the auxiliary burner so as not to exceed a limit defined by the reference value.

In addition, the present invention is a power plant comprising:

a gas turbine configured to drive a turbine in rotation by a combustion gas of high temperature and high pressure;

a heat recovery steam generator in which a plurality of heat exchangers consisting of a superheater, an evaporator and an economizer are installed in a duct along a flow direction of an exhaust gas from the gas turbine, so as to generate steam by utilizing the exhaust gas of the gas turbine;

a steam turbine configured to be driven by the steam generated by the heat recovery steam generator; and a generator configured to be driven by the gas turbine and the steam turbine; wherein the heat recovery steam generator includes:

an auxiliary burner configured to heat the exhaust gas on the upstream side of any one of the heat exchangers;

a fuel supply system configured to supply fuel to the auxiliary burner; and a fuel limiting means configured to set a reference value on which the restriction on the charging quantity to be supplied to the auxiliary burner is based, and to restrict the charging quantity of fuel to the auxiliary burner so as not to exceed a limit defined by the reference value

BRIEF DESCRIPTION OF THE DRAWINGS

FIG. 1 is a schematic view of a power plant including a heat recovery steam generator in an embodiment of the present invention.

FIG. 2 is a schematic view showing the heat recovery steam generator in the embodiment of the present invention.

FIG. 3 is a graph showing variation in limitation on fuel quantity to auxiliary burners in the heat recovery steam generator in the embodiment of the present present invention.

BEST MODE FOR CARRYING OUT THE INVENTION

Embodiments of a heat recovery steam generator and a power plant according to the present invention will be described herebelow with reference to the accompanying drawings.

First Embodiment

FIG. 1 is a schematic view of a power plant of a combined-cycle type to which the heat recovery steam generator in this embodiment is applied.

In FIG. 1, the reference numeral 10 denotes a generator, 12 denotes a steam turbine and 14 denotes a gas turbine. The reference numeral 16 denotes the heat recovery steam generator.

The generator 10 is connected to the steam turbine 12 by a drive shaft 18 in common to the gas turbine 14. An air compressor 20 is coupled to the drive shaft 18. The air compressor 20 compresses air A sucked from the outside, and supplies a combustor 22 with the air A of high temperature and high pressure. In the combustor 22, the compressed air is mixed with fuel which is supplied from a fuel system 24 to burn up, so that combustion gas of high temperature and high pressure is supplied to the gas turbine 14. Due to the expansion of the combustion gas, a turbine in the gas turbine 14 is driven in rotation, whereby the generator 10 is operated. Exhaust gas 25, discharged from the gas turbine 14, is led to the heat recovery steam generator 16 through an exhaust duct 26.

As shown in FIG. 1, inside a duct 27 in the heat recovery steam generator 16, four types of heat exchangers, i.e., a high-temperature superheater 28, a low-temperature superheater 30, an evaporator 32 and an economizer 34 are installed from upstream to downstream in order along a flow direction of the exhaust gas 25 discharged from the gas turbine 14. The evaporator 32 is provided with a steam drum 36. The economizer 34 heats up boiler feed water by the exhaust gas 25 and then supplies the water to the steam drum 36. The steam drum 36 separates water from saturated steam generated in the evaporator 32. An inside of the steam drum 36, a water level is maintained at a predetermined level, such that the water and the saturated steam are well balanced. The evaporator 32 is recharged with water which is separated from the saturated steam in the steam drum 36.

The saturated steam inside the steam drum 36 is transferred to the low-temperature superheater 30 through a saturated steam pipe 38. The saturated steam is superheated in the low-temperature superheater 30 and is then transferred to the high-temperature superheater 28. The steam is further superheated in the high-temperature superheater 28. A desuperheater 40 for regulating the steam temperature is installed between the low-temperature superheater 30 and the high-temperature superheater 28.

An outlet pipe 42 is connected to a outlet of the high-temperature superheater 28. The steam superheated by the high-temperature superheater 28 is transferred to the steam turbine 12 through the outlet pipe 42. The steam turbine 12 is rotated by the expansion of the superheated steam. The expanded steam is transferred to a condenser 43 to turn into water. Then, the water, passing through a condensate return pipe 45 by a condenser pump 46, is compressed by a feed pump 46. Thereafter, the water is returned to the economizer 34. Fuel supply pipes 54 and 55, which respectively supply fuel to auxiliary burners 50 and 52, branch from the fuel system 24.

In the heat recovery steam generator 16 in this embodiment, the auxiliary burners 50 and 52 are installed on the locations, as described below.

The first stage auxiliary burner 50 is located on the most upstream position in the flow direction of the exhaust gas 25. In the case of the heat recovery steam generator 16 in this embodiment, the first stage auxiliary burner 50 is installed on the upstream position relative to the high-temperature superheater 28. In the first stage auxiliary burner 50, there are disposed a plurality of burners 51 so as to face toward the high-temperature superheater 28 on the downstream side. The first fuel supply pipe 54 is provided with a fuel regulating valve 56 and a fuel shut off valve 57. Thus, the charging quantity of fuel to be burned by the burners 51 is controlled by regulating an valve opening of the fuel regulating valve 56. To cease the operation of the burners 51, the fuel blocking valve 57 is closed.

The second stage auxiliary burner 52 is located on a position downstream of the first stage auxiliary burner 50. In the case of this embodiment, the second stage auxiliary burner 52 is located on the upstream side of the evaporator 32. In the second stage auxiliary burner 52, there are disposed a plurality of burners 53 so as to face toward the evaporator 32 which located on the position downstream thereof. The second fuel supply pipe 55 is provided with a fuel regulating valve 58 that regulates the charging quantity of fuel, and a fuel shut off valve 59 that is closed when the operation of burners 53 are suspended.

In FIG. 2, the reference numeral 60 denotes a control unit that controls the operation of ignition and extinction of the first and second stage auxiliary burners 50, 52, and the charging quantity of fuel to be charged to the first and second auxiliary burners 50, 52. A flow rate of fuel flowing through the fuel line 24 is detected by a flowmeter 62 and is inputted to the control unit 60. In addition, a steam flowmeter 63 for measuring the flow rate of steam is disposed on the outlet pipe 42 of the generator outlet. The flow rate of steam is inputted from the steam flowmeter 63 to the control unit 60.

An exhaust-gas temperature detector 64 for detecting a temperature of exhaust gas is disposed between the second stage auxiliary burner 52 and the evaporator 32. Similarly, an exhaust-gas temperature detector 65 is disposed between the first stage auxiliary burner 50 and the high-temperature superheater 28.

With respect to the first stage auxiliary burner 50 and the second stage auxiliary burner 52, reference values, which are criteria for setting a limit on the charging quantity of fuel to be charged to the first stage auxiliary burner 50 and the second stage auxiliary burner 52, are predetermined. Based on the reference values, the control unit 60 is configured to regulate the opening of the fuel regulating valves 56 and 58 respectively, so as to set a limit on the charging quantity of fuel to the first stage auxiliary burner 50 and the second stage auxiliary burner 52.

The heat recovery steam generator in this embodiment is as structured above. Next, the operation and the effect thereof are described hereafter.

At first, the operation of the first stage auxiliary burner 50 and the operation of the second stage auxiliary burner 52 in the heat recovery steam generator are described.

The second stage auxiliary burner 52 is installed on the upstream side of the evaporator 32. Thus, when the exhaust gas 25 is heated by flames spurted from the burners 53, as a whole, the evaporation amount in the evaporator 32 can be increased.

In contrast, the first stage auxiliary burner 50 is installed on the upstream side of the high-temperature superheater 28 and the low-temperature superheater 30. Thus, when the exhaust gas 25 is heated by flames spurted from the burners 51, the degree of superheating of steam generated in the high-temperature super heater 28 and the low-temperature superheater 30 can be increased.

When the output of the gas turbine 14 is on a high level, regarding to the flow rate of the exhaust gas 25 supplied from the gas turbine 14, the flow rate of the exhaust gas 25 increases. Reversely, as the output of the gas turbine 14 lowers, the flow rate of the exhaust gas 25 decreases.

In a case when the output of the gas turbine 14 is on a low level, the flow rate of exhaust gas to be supplied to the heat recovery steam generator 16 is small. Thus, when excessive fuel is charged to the first stage auxiliary burner 50, or the second stage auxiliary burner 52, the temperature of the exhaust gas 25 excessively rises, which may damage plant facilities such as heat-transfer pipes in the high-temperature superheater 28 and the evaporator 32.

In this embodiment, an upper limit value T1 of the exhaust gas temperature in the downstream side of the second stage auxiliary burner 52 is predetermined. In order to prevent the exhaust gas temperature from exceeding the upper limit value T1, a limit is placed on the charging quantity of fuel charged to the second stage auxiliary burner 52 in the following manner.

For the purpose of increasing the amount of steam in the heat recovery steam generator 16, because of shortage of steam to be supplied to the steam turbine 12, the burners 53 of the second stage auxiliary burner 52 are set fire in the beginning and the charging quantity of fuel charged to the second stage auxiliary combustion equipment 52 is increased. In a case where the second stage auxiliary burner 52 and the first stage auxiliary burner 50 are fired from the beginning and the charging quantity of fuel thereto are simultaneously increased, or the first stage auxiliary burner 50 is fired prior to the ignition of the second stage auxiliary burner 52 and the charging quantity of fuel thereto is increased, the high-temperature superheater 28 and the low-temperature superheater 30 may be superheated excessively with a insufficient steam amount. This is disadvantageous.

When the charging quantity of fuel to the second stage auxiliary burner 52 gradually increases, the increase of the firepower of the burners 53 rises the temperature of the exhaust gas 25. Consequently, the amount of steam generated in the evaporator 32 increases. The steam from the evaporator 32 is fed to the low-temperature superheater 30 and the high-temperature superheater 28 in order. In the super heaters 30 and 28, the steam is superheated by the exhaust gas 25 discharged from the gas turbine 14. Then, the superheated steam is supplied to the steam turbine 12.

Meanwhile, the exhaust gas temperature in the downstream side of the second stage auxiliary burner 52 is detected by the gas-temperature detector 64. The control unit 60 monitors the rise in the exhaust gas temperature. When the exhaust gas temperature continues rising and comes close to the upper limit temperature T1, the control unit 60 restricts the opening of the fuel regulating valve 58 to decrease the flow rate of fuel charged to the second stage auxiliary burner 52, whereby the exhaust gas temperature falls consequently.

Further, in this embodiment, in place of outputting the temperature signal to the control unit 60 from the gas temperature detector 64 on the downstream side of the second stage auxiliary 52, it is applicable to predetermine an upper limit value on the charging quantity of fuel to the second stage auxiliary burner 52 depending on the output of the gas turbine 14. This will be described with reference to FIG. 3 hereafter.

FIG. 3 is a graph showing a relationship between the output of the gas turbine 14 and the output of the second stage auxiliary burner 52. The output of the second stage auxiliary burner 52 is proportional to the charging quantity of fuel to the second stage auxiliary burner 52.

In a case where the output of the gas turbine 14 is on a low level, the amount of exhaust gas supplied to the heat recovery steam generator 16 is small. The lower the output of the gas turbine 14 is, the higher the exhaust gas temperature rises, even when the same amount of fuel is supplied to the second stage auxiliary burner 52. Therefore, in order that the exhaust gas temperature does not reach the upper limit temperature T1, it is necessary to change the upper limit on the fuel quantity as to the second stage auxiliary burner 52, depending on the output of the gas turbine 14.

In a region where the output of the gas turbine 14 is on a relatively low level, the higher the output of the gas turbine 14 is, the higher the upper limit on the fuel quantity as to the second stage auxiliary burner 52 is set proportionally to the output of the gas turbine 14. As shown by the line a in FIG. 3, due to the change of the upper limit on the fuel quantity, the output of the second stage auxiliary burner 52 is restricted such that the upper limit thereof linearly increases.

Consequently, the charging quantity of fuel to the second stage auxiliary burner 52 is restricted such that the exhaust gas temperature does not reach the upper limit temperature T1 even when the output of the gas turbine 14 varies in the low output region. As a result, the heat-transfer pipe of the evaporator 32 can be prevented from being superheated. It is applicable to improve the safety in the following manner. On the condition that the upper limit is set on the charging quantity to the second stage auxiliary burner 52 depending on the output of the gas turbine, it is applicable to adopt the fore-mentioned control in which the charging quantity is controlled base on the gas temperature detected by the gas temperature detector 64 on the downstream side of the second stage auxiliary burner 52.

Then, when the steam generation amount in the evaporator 32 increases, the degree of superheating of steam in the high-temperature superheater 28 and the low-temperature superheater 30 gets lower. In this case, the first stage auxiliary burner 50 is fired to increase the temperature of the exhaust gas.

Similarly to the second stage auxiliary burner 52 as described above, an upper limit value T2 of the exhaust gas temperature on the downstream side of the first stage auxiliary burner 50 may be predetermined, and a limit is placed on the charging quantity of fuel to the first stage auxiliary burner 50 in order to prevent the exhaust gas temperature from exceeding the upper limit value T2. In this modification, the control unit 60 may use the steam flow rate delivered from the steam flowmeter 63 disposed on the outlet pipe 42 of the generator outlet, in addition to the temperature of the exhaust gas delivered from the exhaust-gas temperature detector 65 disposed between the first stage auxiliary burner 50 and the high-temperature superheater. Even if the temperature of the exhaust gas on the downstream side of the first stage auxiliary burner 50 is relatively high, the heat-transfer pipes and the like in the high-temperature superheater 28 and the low-temperature superheater 30 can be sufficiently cooled, in condition that the flow rate of steam flowing through the high-temperature superheater 28 and the low-temperature superheater 30 is sufficiently enough. Thus, by increasing the upper limit value on the charging quantity of fuel to the first stage auxiliary burner 50 depending on the increase in steam flow rate, the heat-transfer pipes and the like in the high-temperature superheater 28 and the low-temperature superheater 30 can be prevented from being superheated. In this manner, by controlling the charging quantity of fuel to the first stage auxiliary burner 50, with the use of the exhaust gas temperature detected by the exhaust-gas temperature detector 65 or the steam flow rate detected by the steam flow meter 63, a larger amount of steam can be generated.

The above control is available when the output of the gas turbine 14 is on a low level. In a region where the output of the gas turbine 14 is on a high level, a limit is set on the charging quantity of fuel to the second stage auxiliary burner 52, by using an evaporation amount as a reference in the following manner.

When the output of the gas turbine 14 is on the high level, the flow rate of exhaust gas supplied to the heat recovery steam generator 16 increases. In such a condition, there is a possibility that the steam flow rate reaches to the maximum value that is determined by the specification of the generator body such as a safety valve capacity, until the exhaust gas temperature on the downstream side of the first stage auxiliary burner 50 and the second stage auxiliary burner 52 rise up to the upper limit value T2.

Thus, while the control unit 60 monitors the steam flow rate at the generator outlet by means of the steam flowmeter 63, the control unit 60 sets the limit on the charging quantity of fuel to the second stage auxiliary burner 52 so that the steam flow rate does not exceed the maximum value determined by the safety valve capacity and the like. Also in the control in which the charging quantity of fuel to the second stage auxiliary burner 52 is restricted based on the steam flow rate at the generator outlet in the region where the output of the gas turbine 14 is on the high level, it is possible to limit the charging quantity to the auxiliary burner 52 based on the upper limit which is predetermined on the gas turbine output instead of depending on the steam flow rate detected by the steam flow meter 63.

The line b in FIG. 3 represents a variation of the upper limit on the output of the second stage auxiliary burner 52, when the charging quantity of fuel is restricted as described above, in the region where the gas turbine output is on the high level.

When the output of the gas turbine 14 is on the high level, the amount of exhaust gas supplied to the heat recovery steam generator 16 increases. The higher the output of the gas turbine 14 is, the more the steam generation amount increases, in the condition that the fixed amount of fuel is charged to the second stage auxiliary burner 52. Therefore, in order that the steam generation amount does not exceed the maximum value, the upper limit value of the charging quantity of fuel is gradually lowered in reverse proportion to the increase in output of the gas turbine 14.

As shown by the line b in FIG. 3, in a case where the output of the gas turbine 14 is on the high level, the higher the output is, the smaller the upper limit is set on the charging quantity of fuel to the second stage auxiliary burner 52. Thus, the upper limit on the output of the second stage auxiliary burner 52 is restricted so as to decrease linearly.

When the evaporation amount comes close to the maximum, the control unit 60 restricts the opening of the fuel regulating valve 58. Since the flow rate of fuel supplied to the second stage auxiliary burner 52 decreases, the evaporation amount gets lower in accordance therewith. In this manner, even when the output of the gas turbine 14 changes in the high output region, the control unit 60 set limit on the charging quantity of fuel to the second stage auxiliary burner 52, such that the steam generation amount does not reach the maximum. As a result, an excessive flow rate of steam can be prevented.

As described above, by predetermining the upper limit on the charging quantity of fuel to the second stage auxiliary burner 52, depending on the output of the gas turbine 14, it is not necessary to carry out relatively complicated control of the upper limit on the charging quantity of fuel based on the steam flow rate, by using the steam flowmeter 63. It is possible to combine control of the upper limit on the charging quantity of fuel based on the output of the gas turbine 14 and control of the upper limit on the charging quantity of fuel based on the steam flow rate from the steam flowmeter 63. In this case, it is possible to use the smaller upper limit on the second stage auxiliary 52. In this manner, the more safety system can be achieved.

Similarly to the second stage auxiliary combustion equipment 52, the charging quantity of fuel charged to the first stage auxiliary burner 50 may be restricted.

Second Embodiment

Next, the second embodiment of the present invention is described with reference to FIG. 2 and FIG. 3.

The second embodiment is directed to setting the limit on the charging quantity of fuel in a situation where a steam amount necessary in the heat recovery steam generator 16 can be obtained only by exhaust gas supplied from the gas turbine 14.

In the situation where sufficient steam amount can be obtained by exhaust gas from the gas turbine 14, no special problem occurs, even if the first and second auxiliary burners 50 and 52 are ceased, from the viewpoint of steam generation amount.

However, in a case where the second stage auxiliary burner 52 is suspended, the amount of steam generated by the evaporator 32 is small, whereby the amount of steam passing thorough heat-transfer pipes in the generator becomes insufficient. In particular, there is a possibility that the heat-transfer pipes in the high-temperature superheater 28 and the low-temperature superheater 30 are superheated beyond the allowable range in design by exhaust gas.

In the heat recovery steam generator 16 in this embodiment, even in the case where sufficient amount of steam can be obtained only by exhaust gas from the gas turbine 14, the minimum charging quantity of fuel which is large enough to produce sufficient steam for preventing the heat-transfer pipes of the high-temperature superheater 28 and the low-temperature superheater 30 from superheating is predetermined on the second stage auxiliary burner 52. For example, as shown by lines c and d in FIG. 3, depending on the output of the gas turbine 14, the output of the second stage auxiliary burner 52 is maintained such that the output does not fall below the minimum output any time.

In this embodiment, when the output of the gas turbine is on the low level, the control unit 60 restricts the opening of the fuel regulating valve 58 to charge fuel to the second stage auxiliary burner 52, such that the charging quantity of fuel does not fall below a level corresponding to the minimum output shown by the line c.

As the output of the gas turbine 14 increases, the flow rate of exhaust gas from the gas turbine 14 increases. Consequently, the control unit 60 gradually restricts the opening of the fuel regulating valve 58. As shown by the line d, the minimum charging quantity of fuel required for generating the minimum steam gradually decreases.

According to the second embodiment, the minimum quantity of fuel is supplied any time to the second stage auxiliary burner 52 under any circumstances. As a result, steam sufficient enough to prevent the heat-transfer pipes of the high-temperature superheater 28 and the low-temperature superheater 30 from superheating always flow in the heat-transfer pipes. Thus, unlike in a conventional heat recovery steam generator, no excessive facilities are necessary, for example, it is not necessary to increase a thickness of the heat-transfer pipe or to use a high-strength material for the heat-transfer pipe. Therefore, not only the cost for facilities can be reduced but also superheating the heat-transfer pipe can be securely prevented.

The heat recovery steam generator of the present invention has been described above by refereeing to the embodiments provided with the first stage auxiliary burner and the second stage auxiliary burner. However, the embodiments are mere examples, and the scope of the present invention is not limited thereto. For example, the present invention can be applied to a heat recovery steam generator of a one-stage auxiliary burner type, where a single auxiliary burner is disposed on the upstream of an evaporator.

In addition, not limited to a steam turbine, the heat recovery steam generator of the present invention can be applied to a plant that supplies steam to a distilling plant, for example.

The invention claimed is:

1. A heat recovery steam generator, comprising:
a duct, in which an exhaust gas from a gas turbine is configured to flow;
a superheater, an evaporator and an economizer installed in the duct along a flow direction of the exhaust gas;
an auxiliary burner configured to heat the exhaust gas and provided at an upstream position in the flow direction of the exhaust gas relative to any one of the superheater, the evaporator, and the economizer;
a fuel supply configured to supply fuel to the auxiliary burner;
a temperature detector configured to detect a temperature of the exhaust gas and provided at a downstream position in the flow direction of the exhaust gas relative to the auxiliary burner; and
a fuel regulator configured to regulate a quantity of the fuel to be supplied to the auxiliary burner such that:
an upper limit of the quantity of the fuel increases in proportion to an increase of the output of the gas turbine in a condition where the output is lower than a predetermined output, and
the temperature detected by the temperature detector does not exceed a predetermined upper limit.

2. A heat recovery steam generator comprising:
a duct, in which an exhaust gas from a gas turbine is configured to flow;
a superheater, an evaporator and an economizer installed in the duct along a flow direction of the exhaust gas;
an auxiliary burner configured to heat the exhaust gas and provided at an upstream position in the flow direction of the exhaust gas relative to any one of the superheater, the evaporator, and the economizer;
a fuel supply configured to supply fuel to the auxiliary burner;
an evaporation amount detector configured to detect a flow rate of steam at an outlet of the heat recovery steam generator; and
a fuel regulator configured to regulate a quantity of the fuel to be supplied to the auxiliary burner such that:
an upper limit of the quantity of the fuel decreases in proportion to an increase in the output of the gas turbine in a condition where the output is higher than a predetermined output, and
an upper limit of the flow rate detected by the evaporation amount detector does not exceed a predetermined upper limit.

3. A heat recovery steam generator, comprising:
a duct, in which an exhaust gas from a gas turbine is configured to flow;
a superheater, an evaporator and an economizer installed in the duct along a flow direction of the exhaust gas;
an auxiliary burner configured to heat the exhaust gas and provided at an upstream position in the flow direction of the exhaust gas relative to any one of the superheater, the evaporator, and the economizer;
a fuel supply configured to supply fuel to the auxiliary burner; and
a fuel regulator configured to regulate a quantity of the fuel to be supplied to the auxiliary burner such that the quantity does not fall below a predetermined minimum, wherein the predetermined minimum is set to gradually decrease depending on an increase of the output of the gas turbine in a first condition where the output is higher than a predetermined output.

4. The heat recovery steam generator according to claim 3, wherein the predetermined minimum is set constant in a second condition where the output of the gas turbine is equal to or lower than the predetermined output.

5. A power plant comprising:
a gas turbine configured to discharge an exhaust gas; and
the heat recovery steam generator according to claim 1.

6. A power plant comprising:
a gas turbine configured to discharge an exhaust gas; and
the heat recovery steam generator according to claim 2.

7. A power plant comprising:
a gas turbine configured to discharge an exhaust gas; and
the heat recovery steam generator according to claim 3.

* * * * *